Patented Nov. 7, 1944

2,362,083

UNITED STATES PATENT OFFICE 2,362,083

ICE COLOR PRODUCING COMPOSITIONS

Jerry Michael Mecco, Somerville, N. J., assignor to American Cyanamid Company, New York, N. Y., a corporation of Maine No Drawing. Application September 10, 1942, Serial No. 457,859

7 Claims. (Cl. 8—45)

This invention relates to improved compositions for producing ice color printing compositions.

Various compositions for producing ice colors have been developed, one of the best known and commercially important types containing as active ingredients an ice color coupling component and an ice color diazo compound, stabilized against azoic coupling in alkaline medium by reaction with a nitrogen compound. Best keeping properties are usually obtained with such compositions in the form of a dry mixture. The products are made up into printing pastes with printing thickening and alkali and after application to a textile fabric the color is developed by acids, frequently by exposure to vapors of acetic acid at an elevated temperature. This results in splitting of the chemical compound formed between the diazo compound and the stabilizer and sets free the diazo compound which then reacts with the coupling component.

According to the present invention, ice color prints of superior strength and brilliance are obtained when printing pastes are prepared from ice color compositions containing a mono-alkali metal aluminate. The mono-alkali metal aluminate is incorporated in a dry mixture of the stabilized ice color diazo compound and the ice color coupling component.

Not only are improved strength and brilliance obtained but the printing pastes are cleaner, clearer and more stable, and hence produce stronger and brighter reprints on standing, and a shorter time for full color development with acid vapors results, which is a considerable economic advantage since increased output is thus obtained from a given size of equipment.

The exact mechanism by which the mono-alkali metal aluminate operates to increase stability and printing power of the pastes obtained from compositions of the present invention has not been fully determined, and it is not desired to limit the invention to any particular theory of action. However, it seems probable that at least one factor may be the formation of a finely precipitated hydrated aluminum oxide during development which acts as an extender or carrier for the pigment, the final result being a more completely covered fiber and a greater exposed surface of the pigment. It is quite possible that other factors may be involved and may in fact be more important.

The nature of the alkali metal does not appear to exert any particular effect, the alkali metals being in general equivalents for the purposes of the present invention. It is, therefore, preferable by reason of lower costs to use mono-sodium aluminate in most cases. However, the particular aluminate is vital. When poly alkali metal aluminates are used in the dry composition, the mixtures tend to become caked, part of the diazo compound decomposes and forms dye prematurely, and when such compositions are used in coloring textile materials by the usual process prints are obtained which show inferior fastness to rubbing or crocking and decreased print strength.

Though the amounts of mono-alkali metal aluminate are not critical and they are useful over a considerable range, an optimum amount will, of course, be chosen for each composition. A substantial quantity is required as the action does not appear to be catalytic, and amounts of the order of magnitude of 10% or more of the dry ice color composition are effective.

It is a further advantage of the present invention that the presence of the mono-alkali metal aluminate does not interfere with the action of other materials frequently employed in order to improve coloring processes. Thus, for example, various printing assistants, wetting or dispersing agents may be introduced, or inactive diluents such as neutral inorganic salts, sugars, urea, and the like may be incorporated and the action is not hindered by the presence of the mono-alkali metal aluminate.

While it is an important advantage of the present invention that operating techniques are for the most part not changed, there is one limitation which should be observed to obtain best results. Development should be by acid vapors rather than by dilute solutions of acid. Both methods are used in developing ice colors, and in the past for some purposes they have been equivalent. They are, however, not equivalent in the present invention, as only the use of acid vapors gives markedly improved results. This is an added piece of evidence in favor of the possible mechanism referred to above, as it would be expected that strong liquid acids would tend to dissolve precipitated aluminum hydroxide and it is possible that this may be a factor in the difference in results obtained by the two methods of development.

The present invention is applicable quite generally to all of the known ice color compositions which contain diazos stabilized against coupling in alkaline solution by their reaction with nitrogen compounds, and this is an advantage because a wide choice of nitrogen stabilizing agents or stabilized ice color compositions may be used.

In the present specification and claims the term

"ice color diazo compound" or "diazo compound" is used in a somewhat broader sense as is common in the ice color art. The terms are not intended to be limited to compounds showing only a single diazo group, but include also compounds which have two diazo groups, such as stabilized tetrazotized diamines. The ice color diazo compounds, as is well known, are in general limited to diazotized amines which are free from solubilizing groups such as sulfonic and carboxylic acid groups.

Without intending to limit the present invention to the use of any particular diazo components, some typical amines which can be diazotized to product diazo components may be mentioned, such as: Aniline, its homologues, their halogen derivatives, their nitro derivatives, their alkoxy and aryloxy derivatives, their acylamino derivatives, their cyano derivatives, xenylamine, the naphthylamines, heterocyclic amines, such amino carbazols, amino azo compounds, etc. Furthermore, diamines in which only one of the amino groups can be diazotized, such as 2,6-dichloro-1,4-phenylene diamine, can be employed. Diamines in which both amino groups can be diazotized, e. g., benzidine, derivatives of 4,4'-diaminostilbene, can be used. Where substituents are mentioned, it is to be understood that also substituents of different types may substitute the diazo component simultaneously, such as, e. g., in 2-methoxy-5-chloroaniline.

Many ice color diazo compounds are known stabilized with nitrogen compounds, stabilized products being stable against azoic coupling in alkaline medium as well as stable against decomposition. One group comprises diazo amino or diazo imino compounds.

Typical stabilizing compounds are amino-sulfonic and amino-carboxylic acids, such as: Methyl taurine, sarcosine, 4-sulfo-2-amino benzoic acid, pipecolinic acid, proline, amino acids resulting from the degradation of proteins, etc. In these cases, the solubilizing group is an acidic group; the acidic group may also be the sulfamide group. However, it is known that the solubilizing group may also be an ammonium salt group or a polyalcohol radical as, e. g., in methyl glucamine.

A second large group of stabilized diazo compounds useful in the ice color producing compositions comprises diazo-amidines and, particularly diazo guanidines containing solubilizing groups such as sulfonic and carboxylic groups. The stabilizers from which they are produced contain amidine radicals such as guanidine radicals having at least one hydrogen attached to the nitrogen and capable of being replaced by the diazo radical. Examples of such stabilizers are various guanidyl sulfonic and carboxylic acids such as guanidyl ethane sulfonic acid (guanyl taurine), creatine. Further stabilizers of the second group are, e. g., solubilized guanyl urea derivatives such as guanyl urea-N-sulfonic acid or N-nitroguanyl urea and solubilized biguanide derivatives, particularly biguanidyl sulfonic and carboxylic acids such as 2-biguanidyl naphthalene-1-sulfonic acid. Other stabilizers of the second group are acidic amidines which do not contain sulfonic or carboxylic acid groups such as dicyandiamide and its derivatives.

A third, and less important group of stabilizers comprises cyanamide and cyanamide carboxylic acid.

While the advantages of this invention are realized with the whole group of stabilized diazo compounds as defined above, they are particularly conspicuous with those stabilized with guanyl urea-N-sulfonic acid.

The coupling components useable in the present invention include all of the ordinary ice color coupling components such as: The naphthols, pyrazolones, hydroxy-bensofluorenones, benzoyl-naphthols, and various N-substituted amides, particularly arylides of 2-hydroxy-3-naphthoic acid and its 5,6,7,8-tetra hydro derivative, of 2-hydroxy-3-anthroic acid, of methyl and dimethyl salicylic acids, of hydroxy-carbazole-carboxylic acids, of hydroxy-benzo-carbazole-carboxylic acids, of acetoacetic acid, of furoyl-acetic acid, of benzoylacetic acid, of terephthaloyl-bis-acetic acid, of hydroxy-dibenzofurane-carboxylic acids, of hydroxydibenzothiophene carboxylic acids, etc.

The invention will be described in greater detail in conjunction with the following specific examples which are typical illustrations. The parts are by weight.

*Example 1*

229.5 parts of the stabilized diazo compound (disodium salt, 85.2%), derived from diazotized 2-methyl-5-chloroaniline, and guanyl urea-N-sulfonic acid are thoroughly mixed with 150.9 parts of the ortho-toluidide of 2-hydroxy-3-naphthoic acid and 119.6 parts of mono-sodium aluminate.

The product is a dry non-hygroscopic powder which is stable when stored in the open air or in sealed containers.

5.0 parts of the dry mixture containing mono-sodium aluminate are dissolved with 5.0 parts ethylene glycol mono-ethyl ether, 2.5 parts 30° Bé. caustic, 17.5 parts water and 70.0 parts of suitable starch thickener. The resulting paste is printed on cotton piece goods, the print dried at 60° C., the color developed by treatment with live steam containing vapors of weak, volatile acids, the developed print finished by washing, soaping and drying.

The pattern shows a bright red, the strength and brilliancy of which are considerably improved over that obtained from an equivalent strength product which contains no aluminate. The time for full color development is shorter than for a print prepared from a product without the mono-sodium aluminate. Also, the printing paste prepared from the product containing the mono-sodium aluminate is clearer and cleaner and remains so on keeping. This results in stronger and brighter reprints after a period of keeping.

When 2.22 parts of the stabilized diazo compound, 1.46 parts of the coupling component, and 1.17 parts of tri-sodium aluminate are mixed a product is obtained which is yellow in color, indicating some reaction with the coupling component, and the product does not keep well, becoming reddish on storage, which is an indication of decomposition of the diazo component and premature coupling. On storage the product loses printing strength rapidly as contrasted with the product described above using mono-sodium aluminate.

Instead of the coupling component described above if the ortho-phenetidide of 2-hydroxy-3-naphthoic acid is used the product is equally stable and when printed as described above produces scarlet prints of greatly improved brilliance and strength over prints prepared without the mono-sodium aluminate.

Example 2

269.9 parts of a stabilized diazo compound (disodium salt 85.2%), prepared from diazotized 2-methyl-4-chloroaniline and guanyl urea-N-sulfonic acid by a procedure similar to that described in U. S. Patent 2,154,470, are thoroly mixed with 177 parts of the ortho-toluidide of 2-hydroxy-3-naphthoic acid and 53.1 parts of mono-sodium aluminate.

The resulting product is stable, non-hygroscopic, and does not preceptibly develop color prematurely on long storage. It is more stable in this respect than a similar product prepared from trisodium aluminate.

A printing paste is prepared from 2.5 parts of this mixture with 2.5 parts of ethylene glycol mono-ethyl ether, 1.25 parts of 30° Bé. caustic, 23.7 parts of water, and 70 parts of a starch thickener. Applied to cotton goods as described in Example No. 1, a strong red of bluish shade is obtained. The strength and brilliancy of the pattern, as well as the stability of the printing paste evidenced by reprints after storage of the paste, are greatly improved over these results obtained from a product which was prepared without the mono-sodium aluminate.

Example 3

2.0 parts of the stabilized diazo compound (sodium salt, 66%) derived from diazotized 2-methyl-5-chloroaniline and sarcosine are thoroly mixed with 1.61 parts of the ortho-phenetidide of 2-hydroxy-3-naphthoic acid and 0.97 part of mono-sodium aluminate.

A light tan powder is produced which does not change color on storage. The product yields the same strong and bright prints after long keeping with no decrease in the rubbing or crocking fastness.

When a printing paste is prepared from this mixture, and a print is produced as under Example No. 2, a bright scarlet pattern is obtained, the strength of which is very much improved over that obtained from a product in which the aluminate is not incorporated. Also, the brightness is materially improved. When this printing paste is allowed to stand for several days and is reprinted, the paste containing the product which was blended with mono-sodium aluminate yields a considerably stronger print than does a paste obtained from a product without it.

Example 4

2.24 parts of a stabilized diazo compound (disodium salt 84.5%) prepared by stabilizing diazotized 2-methyl-4-chloroaniline with guanyl urea-N-sulfonic acid as described in Example 2 are thoroly mixed with 1.46 parts of the ortho-toluidide of 2-hydroxy-3-naphthoic acid and 0.6 part of mono-potassium aluminate.

The product is light tan, non-hygroscopic and does not change color or character on storage. Even after long storage the prints obtained are substantially indistinguishable from those prepared from a fresh sample.

A printing paste is prepared and a print is obtained according to the procedure described above for Example 2, the pattern being a strong, bluish shade of red of very good brightness. The strength of this pattern, as well as the brightness, and the strength and brightness of a pattern obtained after the printing paste is allowed to stand for 3 days are materially improved over that obtained from a product which has been prepared without the mono-potassium aluminate.

Example 5

178.0 parts of stabilized diazo compound (disodium salt 85.2%) derived from diazotized 2-methyl-5-chloroaniline and guanyl urea-N-sulfonic acid are thoroly mixed with 78.5 parts of diacetoacetyl ortho-tolidine, 0.8 part of the ortho-toluidide of 2-hydroxy-3-naphthoic acid and 34.0 parts of mono-sodium aluminate.

This light tan product shows no color development on long standing and reprints show no change in shade or strength. This is highly important in this case of mixed blending because premature coupling easily upsets the careful blending ratio of the two coupling components and produces dull off-shade yellows.

This product, converted to a printing paste and applied according to the procedure described above for Example 2, shows a pattern of bright golden yellow shade. The strength and the clarity of this shade are greatly improved over that obtained from a product which is formulated without the mono-sodium aluminate.

Example 6

4.71 parts of the stabilized diazo compound (dipotassium salt 90.6%) derived from diazotized 2-methoxy-5-chloroaniline and guanyl urea-N-sulfonic acid are thoroly mixed with 3.09 parts of the ortho-anisidide of 2-hydroxy-3-naphthoic acid and 1.47 parts of mono-potassium aluminate.

A light yellow product is obtained which does not change in color on storage either in sealed containers or in the open and even after storage for considerable periods of time produces prints which are similar to those obtained from a freshly prepared sample.

When this product is applied from a printing paste according to the procedure described above for Example 1, a very strong red of bluish shade is obtained. The pattern is considerably improved in brightness and in strength over a pattern obtained from a product prepared without the mono-potassium aluminate.

Example 7

4.1 parts of stabilized diazo compound (monosodium salt 73%) obtained from diazotized cresidine and guanyl urea-N-sulfonic acid by a procedure similar to that described in U. S. Patent 2,154,470 are thoroly mixed with 2.58 parts of the meta-nitranilide of 2-hydroxy-3-naphthoic acid and 0.61 part of mono-sodium aluminate. The product is not hygroscopic and remains uncolored and powdery on storage.

This product is converted to a printing paste and is applied to cotton piece goods according to the procedure described under Example 2. The finished pattern is a brilliant bordeaux shade. The printing paste obtained from this product containing the mono-sodium aluminate is considerably more stable; the brightness and the strength of the pattern obtained are much improved over prints obtained from a product prepared without the mono-sodium aluminate.

I claim:

1. A stable dry composition capable of producing ice colors comprising an ice color coupling component, a mono alkali metal aluminate and an ice color diazo compound having the following formula:

stabilized against azoic coupling in alkaline medium in which R is the residue of the ice color diazo component, R' is the residue of a stabilizer linked to the azo group through a nitrogen atom.

2. A stable dry composition capable of producing ice colors comprising an ice color coupling component, a mono sodium aluminate and an ice color diazo compound having the following formula:

$$R-N=N-R'$$

stabilized against azoic coupling in alkaline medium in which R is the residue of the ice color diazo component, R' is the residue of a stabilizer linked to the azo group through a nitrogen atom.

3. A stable dry composition capable of producing ice colors comprising an ice color coupling component, an ice color diazo compound stabilized against azoic coupling in alkaline medium by reaction with guanyl urea-N-sulfonic acid, and a mono-alkali metal aluminate.

4. A stable dry composition capable of producing ice colors comprising an ice color coupling component, an ice color diazo compound stabilized against azoic coupling in alkaline medium by reaction with guanyl urea-N-sulfonic acid, and a mono-sodium aluminate.

5. A stable dry composition capable of producing an ice color comprising the o-toluidide of 2-hydroxy-3-naphthoic acid, mono-sodium aluminate and the disodium salt of the stabilized diazo compound prepared by reacting diazotized 2-methyl-5-chloroaniline and guanyl urea-N-sulfonic acid.

6. A stable dry composition capable of producing an ice color comprising di-acetoacetyl o-tolidine, mono-sodium aluminate and the disodium salt of the stabilized diazo compound prepared by reacting diazotized 2-methyl-5-chloroaniline and guanyl urea-N-sulfonic acid.

7. A stable dry composition capable of producing an ice color comprising the o-toluidide of 2-hydroxy-3-naphthoic acid, mono-sodium aluminate and the disodium salt of the stabilized diazo compound prepared by reacting diazotized 2-methyl-4-chloroaniline and guanyl urea-N-sulfonic acid.

JERRY MICHAEL MECCO.